US008823243B2

(12) United States Patent
Qiao et al.

(10) Patent No.: US 8,823,243 B2
(45) Date of Patent: Sep. 2, 2014

(54) NANOPOROUS MATERIALS FOR USE IN INTELLIGENT SYSTEMS

(76) Inventors: Yu Qiao, San Diego, CA (US); Xinguo Kong, Secaucus, NJ (US)

(*) Notice: Subject to any disclaimer, the term of this patent is extended or adjusted under 35 U.S.C. 154(b) by 1596 days.

(21) Appl. No.: 11/995,333

(22) PCT Filed: Aug. 15, 2006

(86) PCT No.: PCT/US2006/031858
§ 371 (c)(1),
(2), (4) Date: May 21, 2010

(87) PCT Pub. No.: WO2008/054356
PCT Pub. Date: May 8, 2008

(65) Prior Publication Data
US 2010/0225199 A1    Sep. 9, 2010

Related U.S. Application Data

(60) Provisional application No. 60/708,224, filed on Aug. 15, 2005.

(51) Int. Cl.
*H02N 11/00* (2006.01)
*F15B 21/06* (2006.01)
*C22C 1/08* (2006.01)

(52) U.S. Cl.
CPC .......... *H02N 11/006* (2013.01); *C21D 2201/01* (2013.01); *C22C 1/08* (2013.01)
USPC ............................................ 310/300; 60/326

(58) Field of Classification Search
USPC ............ 310/300, 306–307; 60/326, 329, 509, 60/512, 513, 527
See application file for complete search history.

(56) References Cited

U.S. PATENT DOCUMENTS

| | | | | |
|---|---|---|---|---|
| 5,882,496 | A * | 3/1999 | Northrup et al. | 204/601 |
| 6,224,728 | B1 * | 5/2001 | Oborny et al. | 204/450 |
| 2004/0138733 | A1 * | 7/2004 | Weber et al. | 623/1.11 |
| 2007/0058094 | A1 * | 3/2007 | Kuiper et al. | 349/1 |
| 2010/0016460 | A1 * | 1/2010 | Qiao | 521/149 |

FOREIGN PATENT DOCUMENTS

WO    WO 2004099830 A1 * 11/2004 .............. G02B 3/14

* cited by examiner

*Primary Examiner* — Burton Mullins
*Assistant Examiner* — Eric Johnson
(74) *Attorney, Agent, or Firm* — Renner Kenner Greive Bobak Taylor & Weber (57) ABSTRACT

The present invention relates to volume and/or shape memory systems for which the volume and/or shape can be adjusted by controlling one or more variables such as applied voltage and temperature. In one embodiment, the volume and/or shape memory systems of the present invention are controlled and/or adjusted by way of a temperature mechanism. In another embodiment, the volume and/or shape memory systems of the present invention are controlled and/or adjusted by way of a voltage mechanism. In still another embodiment, the present invention provides a device that contains, in part, a smart volume and/or shape memory material that exhibits high energy densities, and can provide large displacements over broad temperature and/or voltage ranges.

11 Claims, 5 Drawing Sheets

NANOPOROUS MATERIALS FOR USE IN INTELLIGENT SYSTEMS

FIELD OF THE INVENTION

The present invention relates to volume and/or shape memory systems for which the volume and/or shape can be adjusted by controlling one or more variables such as applied voltage and temperature. In one embodiment, the volume and/or shape memory systems of the present invention are controlled and/or adjusted by way of a temperature mechanism. In another embodiment, the volume and/or shape memory systems of the present invention are controlled and/or adjusted by way of a voltage mechanism. In still another embodiment, the present invention provides a device that contains, in part, a smart volume and/or shape memory material that exhibits high energy densities, and can provide large displacements over broad temperature and/or voltage ranges.

BACKGROUND OF THE INVENTION

Smart materials are often referred to as shape memory materials. Shape memory materials can generally be classified as: (a) shape memory alloys (SMA) such as Ti—Ni/copper/iron based alloys and inter-metallic compounds; (b) shape memory ceramics (SMC) such as mica/β-spodumene glass-ceramics and martensitic/ferroelectric ceramics; and (c) shape memory polymers (SMP) consisting of fixed and reversible phases. As the temperature or voltage varies, shape memory materials can undergo thermo-elastic or electro-elastic phase transformations. As a result, such materials exhibit shape memory characteristics.

One drawback associated with known and/or conventional shape memory materials are their relatively low energy density and deformability. Thus, there is a need in the art for smart materials exhibiting high energy densities, and smart materials that provide large displacements.

SUMMARY OF THE INVENTION

The present invention relates to volume and/or shape memory systems for which the volume and/or shape can be adjusted by controlling one or more variables such as applied voltage and temperature. In one embodiment, the volume and/or shape memory systems of the present invention are controlled and/or adjusted by way of a temperature mechanism. In another embodiment, the volume and/or shape memory systems of the present invention are controlled and/or adjusted by way of a voltage mechanism. In still another embodiment, the present invention provides a device that contains, in part, a smart volume and/or shape memory material that exhibits high energy densities, and can provide large displacements over broad temperature and/or voltage ranges.

More particularly, the present invention relates to a volume and/or shape memory system, wherein the volume and/or shape can be reversibly controlled by energizing or de-energizing one or more solid-liquid interfaces. Still more particularly, the present invention generally relates to electrically or thermally controlled volume and/or shape memory systems, wherein volume and/or shape can be controlled by adjusting temperature or applied voltage.

In one embodiment, the present invention relates to a volume and/or shape memory system comprising: (a) an energy transducing member; (b) a carrier, wherein the carrier receives the energy transducing member, the energy transducing member being capable of moving relative to the carrier in response to dimensional changes therein; (c) one or more porous materials contained within the carrier; and (d) one or more liquids contained within the carrier, wherein the liquid is in contact with the porous material, and wherein the energy transducing member is in mechanical communication with both the one or more porous materials and one or more liquids contained within the carrier.

In another embodiment, the present invention relates to a volume and/or shape memory system comprising: (A) a carrier means; and (B) an energy transducing means, wherein the carrier means is capable of receiving the energy transducing means, wherein the carrier means receives a nanoporous absorption means, the nanoporous absorption means being capable of absorbing a liquid, wherein the liquid is contained within the carrier means and the liquid is also in contact with the nanoporous absorption means, wherein the nanoporous absorption means is non-wetting towards the liquid means in absence of energy being transferred and/or applied to the system, where such energy causes the nanoporous absorption means to absorb the liquid, and wherein removing the energy being transferred and/or applied to the system results in expulsion of substantially all of the liquid from the absorption means thereby resulting in an absorption/desorption process or processes which in turn result in system volume changes that cause the energy transducing means to move relative to the carrier means.

In still another embodiment, the present invention relates to a volume and/or shape memory system comprising: (i) a carrier having an actuating section, wherein the carrier receives an energy transducing member at the actuating section, the energy transducing member being capable of moving relative to the carrier (e.g., container) in response to dimensional changes therein; (ii) a porous material contained within the carrier; (iii) a liquid contained within the carrier, wherein the liquid is either wetting or non-wetting to the porous material and wherein the energy transducing member is in mechanical communication with the porous material and liquid; and (iv) an energy transfer means capable of effecting changes in interfacial energy at interfaces between the porous material and the liquid.

DETAILED DESCRIPTION OF THE INVENTION

The present invention relates to volume and/or shape memory systems for which the volume and/or shape can be adjusted by controlling one or more variables such as applied voltage and temperature. In one embodiment, the volume and/or shape memory systems of the present invention are controlled and/or adjusted by way of a temperature mechanism. In another embodiment, the volume and/or shape memory systems of the present invention are controlled and/or adjusted by way of a voltage mechanism. In still another embodiment, the present invention provides a device that contains, in part, a smart volume and/or shape memory material that exhibits high energy densities, and can provide large displacements over broad temperature and/or voltage ranges.

More particularly, the present invention relates to a volume and/or shape memory system, wherein the volume and/or shape can be reversibly controlled by energizing or de-energizing one or more solid-liquid interfaces. Still more particularly, the present invention generally relates to electrically or thermally controlled volume and/or shape memory systems, wherein volume and/or shape can be controlled by adjusting temperature or applied voltage.

In one embodiment, the volume and/or shape memory system of the present invention operates as follows. A nanoporous solid phase and a liquid phase that is either wetting or non-wetting to the nanoporous material are both contained within a carrier (e.g., container), which is fitted with an energy transducing member such as a piston or deformable membrane. The solid-liquid interfaces contained therein are energized by any of a variety of appropriate means, thereby inducing the liquid to change from effectively wetting to effectively non-wetting, or vice versa. For instance, under working pressure a liquid that wets the nanoporous material when no potential is applied can become non-wetting to the nanoporous material by applying an appropriate potential. Similarly, an otherwise non-wetting liquid can become wetting by applying an appropriate potential. A change from wetting to non-wetting results in an increased liquid volume as liquid comes out of the one or more nanopores. On the other hand, a change from non-wetting to wetting results in a decreased liquid volume as liquid enters the one or more nanopores. Thus, the energy transducing member can be caused to move relative to the carrier by applying an appropriate potential. Conversely, the solid-liquid interfaces may be de-energized, which causes the energy transducing member to return to its original position.

The term carrier, as used herein, includes a portion of the present invention that functions to hold, contain, or otherwise carry a liquid component and/or a solid nanoporous component. The term energy transducing member, as used herein includes, a portion of the present invention that is in mechanical communication with the liquid and/or nanoporous solid components, and is capable of moving and/or deforming in response to dimensional changes in the liquid/solid components.

Nanoporous materials, as used herein, includes materials having average pore sizes or microchannel/microtube sizes from about 0.5 nm to about 10,000, and may be either electrically conductive or electrically non-conductive. Nanoporous materials within the scope of the present invention include microporous materials with pore sizes smaller than about 2 nm, mesoporous materials with pore sizes larger than about 2 nm but smaller than about 50 nm, macroporous materials with pore sizes larger than about 50 nm, as well as clusters or stacks of nanodots, nanoparticles, nanowires, nanorods, and nanolayers. Nanoporous materials within the scope of the present invention also include micro/nano-electromechanical systems (MNEMS) devices containing micro and/or nano-channels/tubes. The only requirement and/or restriction on the kinds of materials that can comprise the nanoporous material of the present invention is that appropriate materials must be capable of being formed into one or more of suitable structures. Such structures include, but are not limited to, any structure that contains one or more nanopores with such structures being generically classified as either macroscopic (i.e., having one or more dimensions that is/are non-nanoscopic—e.g., macroscopic particles, bricks, or layers), or nanoscopic (e.g., nanodots, nanoparticles, nanowires, nanorods, and/or nanolayers).

Furthermore, nanoporous materials within the scope of the present invention include, but are not limited to, nanoporous oxides, nanoporous silicon, nanoporous carbons, zeolites or zeolite-like materials such as silicalites, porous polymers, porous metals and alloys, natural clays, or any combination of two or more thereof. More particularly, nanoporous materials within the scope of the present invention include, but are not limited to, silica, titania, alumina, zirconia, magnesia, $Nb_2O_5$, $SnO_2$, $In_2O_3$, $ZnO$, kaolins, serpentines, smectites, glauconite, chlorites, vermiculites, attapulgite, sepiolite, allophane, imogolite, zeolites, silicalite, silicon, silicones, polypyrrole, binary compounds such as sulfides and nitrides, polyurethanes, acetates, amorphous carbons, semi-crystalline carbons, crystalline carbons, carbon nanotubes, graphene layers, iron, steel, gold, silver, copper, and any combination of two or more thereof. In another embodiment, nanoporous materials within the scope of the present invention include, but are not limited to, natural nanoporous materials such as diatoms, radiolarii, and abalone shell. In another embodiment, nanoporous materials within the scope of the present invention include, but are not limited to, polymers such as latex, polyolefins, and polyurethanes.

In light of the above, one of ordinary skill in the art would recognize that any of the foregoing materials, alone or in combination may be modified with surface coatings as a means of altering its surface properties. Furthermore, one of ordinary skill in the art would readily recognize that a wide variety of functional groups are available for appropriate surface modifications. For example, such functional groups include, but are not limited to, hydroxyls, silanes, siloxanes, organically substituted siloxanes, alcohols, phenols, amines, carboxylic acids, sulfates, sulfites, sulfides, nitrates, nitrites, nitrides, phosphates, phoshites, nitriles, isocyanides, isothiocyanides, thiols, and any combination of two or more thereof.

Liquids within the scope of the present invention can be either conductive or non-conductive. Thus, in one embodiment, liquids within the scope of the present invention can include, but are not limited to, distilled and/or de-ionized water, waters containing therein one or more dissolved chemicals, molten metals, molten salts (e.g., organic molten salts and inorganic molten salts), oils, oil-based solutions, alcohols, alcohol solutions, benzene, toluene, n-heptane, and any combination of two or more thereof. Molten metals within the scope of the present invention include, but are not limited to, mercury, gallium, lead, or any combination of two or more thereof.

The carrier and energy transducing member can independently comprise any appropriately conductive or non-conductive material. In one embodiment, such a carrier and energy transducing member can include, but is not limited to, metals and alloys such as iron, steels, stainless steels, aluminum, copper and the like; and nickel alloys such as iconel, monel, hastelloy and the like. Additionally, the carrier and energy transducing member can comprise organic polymers including foams that can absorb a liquid such as polyurethane foams, polyacetate foams, and polyelectrolytes such as polyacrylic acid, poly(2-acrylamido-2-methyl-1-propane sulfonic) acid, poly(2-acrylamido-2-methyl-1-propane sulfonic acid-co-acrylonitrile), poly(acrylic acid) and its salts, poly(2-acrylamido-2-methyl-1-propanesulfonic) acid, poly(2-acrylamido-2-methyl-1-propanesulfonic acid-co-acrylonitrile), poly(2-acrylamido-2-methyl-1-propanesulfonic acid-co-styrene), poly(anetholesulfonic acid) and its salts, poly(sodium 4-styrenesulfonate), poly(styrene-alt-maleic acid) and its salts; poly(4-styrenesulfonic acid) and its salts, poly(vinyl sulfate) salts, poly(vinylsulfonic acid, sodium salt), quaternized poly(2-vinylpyridines), 4-styrenesulfonic acid salt hydrates, diallyldimethylammonium chloride, poly(acrylamide-co-diallyldimethylammonium chloride), poly(allylamine hydrochloride), poly(diallyldimethylammonium chloride), manganese hexafluoroacetylacetonate trihydrate, anionic and cationic polysaccharides and polysaccharide derivatives, nucleic acids, gelatin, lignosulfonic acids, polyacrylic and polymethacrylic acid and its copolymers, maleic acid anhydride copolymers, polystyrene sulfonic acid, polyethylene imine, polyamines and polyamideamines, ionenes, poly(diallyldimethylammonium chloride), homo- and copolymer of cationic acrylic acid esters, water absorbing resins, and copolymers, poly-salts, and other derivatives of them.

In another embodiment, the carrier and energy transducing member can comprise one or more super-absorbents and/or materials that can contain and/or absorb a large amount of water or other liquids. In one embodiment, suitable super-absorbents or similar materials include, but are not limited to, poly(acrylic acid-co-acrylamide) salts, poly(acrylic acid) salt-graft-poly(ethylene oxide), poly(2-hydroxyethyl methacrylate), poly(2-hydroxypropyl methacrylate), poly(isobutylene-co-maleic acid), and other salts and copolymers based on them. In still another embodiment, suitable super-absorbents or similar materials include, but are not limited to, materials that can contain a large amount of water such as boric acid and salts thereof, chloride salts, sulfate salts, other acids, other acid salts, alkali compounds, and combinations of two or more thereof. In yet another embodiment, suitable super-absorbents or similar materials include, but are not limited to, sponge-like materials such as sponges, polyurethane and acetate foams, cottons, textiles, composites, and the like.

The nanoporous solid-liquid interface can be energized by any of a variety of appropriate reversible means including, but not limited to, electrical means, thermal means, pressure-based means, or combinations of two or more thereof. In one embodiment, the interface can be energized by applying a voltage to the interface. Alternatively, the interface can be energized and de-energized by increasing and decreasing the temperature at the interface. Additionally, the interface can be energized by mechanically applying a pressure to the liquid thus causing it to infiltrate the one or more nanopores. Conversely, the system can be de-energized by removing the pressure, thus allowing the liquid to flow out from the one or more nanopores. In any case, appropriate means of energizing the interface enables reversible wetting and de-wetting.

Thermally Controlled Systems:

The surface wetting effect caused by thermally energizing the interface can be understood according to the following theory. The equilibrium condition at the liquid-solid interface can be stated as $dG=-SdT+Vdp+\Delta\gamma_0 dA=0$, where G is the free energy, S is entropy, T is temperature, V is volume, p is pressure difference, A is the interface area, and $\Delta\gamma_0$ is the "driving force" of liquid-solid separation. Note that in a porous system with the pore radius of r, $V \approx Ar/2$. Thus, the effective "driving force" is $\Delta\gamma=\gamma_{ls}-\gamma_s^*$, where $\gamma_s^*=\gamma_s+pr/2$. If $\gamma_{ls}<\gamma_s^*$, $\Delta\gamma$ is negative and the liquid-solid separation does not occur; otherwise the liquid will flow out of the pores. As temperature increases $\gamma_s^*$ and $\gamma_{ls}$ decrease with different rates. Therefore, at the equilibrium pressure $P_0=2\Delta\gamma/r$, there is a critical temperature $T_{cr}$ at which $\gamma_s^*=\gamma_{ls}$, i.e. the liquid-solid interface is neutrally stable. As temperature approaches $T_{cr}$, the wetting-dewetting transition occurs, according to two possible cases: (a) $|\partial\gamma_s^*/\partial T|>|\partial\gamma_{ls}/\partial T|$ and (b) $|\partial\gamma_s^*/\partial T|<|\partial\gamma_{ls}/\partial T|$. Stated differently, in type-a materials solid surface energy changes more slowly than the interfacial energy with respect to temperature. Therefore, the wetting condition and consequent volume reduction can be induced in type-a materials by decreasing the temperature. Conversely, in type-b materials the solid surface energy changes faster than the interfacial energy with respect to temperature. Therefore, the wetting condition and consequent volume reduction can be induced in type-b materials by increasing the temperature. Furthermore, since the process is reversible, as T returns to its original value, the system volume will likewise return to its original value. The transition temperature can be adjusted by any of a number of various means, for example by applying an external pressure, modifying the solid surface with functional groups, changing the porous material, or changing the liquid composition, for instance, by including any of a variety of chemical additives to the liquid phase.

Figure 1:
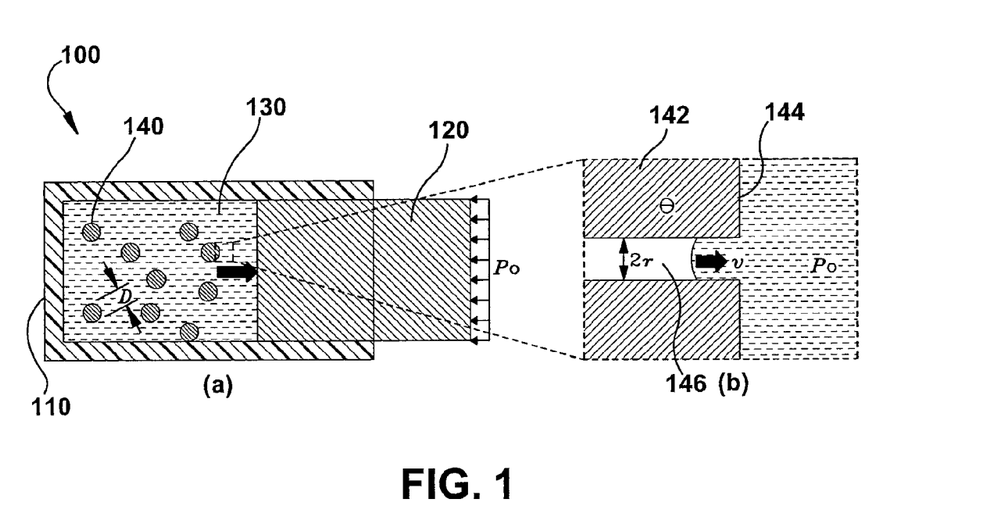
FIG. 1 is a schematic diagram showing (a) a thermally controllable nanoporous smart system; and (b) the outflow in a nanopore caused by the wetting-dewetting transition (WDT)

A drawing illustrating the foregoing principles can be seen in FIG. 1. FIG. 1 shows a thermally controlled device 100 comprising a carrier 110 receiving a piston 120, and containing an electrolyte 130 and nanoporous material 140. A nanopore 146 in a portion of the nanoporous material 142 is shown to contain a quantity of electrolyte 130, which is in contact with the surface 144 of the nanoporous material 142. As temperature changes, the electrolyte 130 becomes non-wetting to the surface 144 and is therefore expelled from the nanopore 146.

Some embodiments of thermally controlled systems can involve the use of temperature sensitive solutions. More particularly, such solutions comprise compounds that have temperature-sensitive solubilities. Such embodiments can be formed by immersing nanoporous material(s) in a temperature sensitive solution, wherein the nanoporous material(s) has nanopore walls that are either non-wettable or neutral to the solution, wherein the solution is saturated or supersaturated. Furthermore, the solution is in contact with an excess of the solid temperature-sensitive compound. Thus, as temperature changes, the solution either precipitates or dissolves more of the temperature sensitive compound. Therefore, the ion density at the solid-liquid interface changes, which leads to variation in infiltration pressure. Furthermore, if the infiltration pressure crosses, increases above, or decreases below, the working pressure then a de-wetting-to-wetting or wetting-to-de-wetting transition occurs. Inasmuch as the foregoing process is reversible, the system has volume and/or shape memory.

One example of a thermally controlled system comprises the following. An aqueous liquid including 10 grams of de-ionized water and 10 grams of sodium acetate that is placed in a carrier in contact with 0.5 grams of solid ZSM-5 zeolite. This solid/liquid system is placed under a substantially constant 82 MPa load through a energy transducing means, such as a piston. As the temperature increases, more sodium acetate is dissolved, therefore the ion density at the solid-liquid interface increases. Since infiltration pressure is dependent upon ion density, the infiltration pressure increases accordingly. If the temperature continues to increase, eventually the infiltration pressure will be come so high that the 82 MPa load can no longer keep the liquid in the zeolite, and therefore the volume of the system increases. Conversely, if the temperature decreases enough, then the liquid will re-infiltrate the zeolite and the volume will decrease accordingly. To the extent that this process is reversible, the system displays volume memory.

Another example of a shape and/or volume memory systems that uses one or more temperature sensitive materials is a system that utilizes sodium phosphate. Specifically, sodium phosphate dibasic ($Na_2HPO_4$) is used in combination with a water solvent. The solubility of $Na_2HPO_4$ changes from about 20% to about 70% as the temperature increases from about 20° C. to about 80° C. According to this example about 80 grams of $Na_2HPO_4$ is mixed with about 100 grams of water at room temperature to the point of saturation. Then about 0.5 grams nanoporous ZSM-5 zeolite is added to about 4.0 grams of the saturated aqueous $Na_2HPO_4$ and placed in the stainless steel carrier set forth above. In this example the carrier has a cross-sectional area of 286 $mm^2$. The carrier is then sealed at room temperature with a stainless steel piston having an O-ring (113 PU70, O-rings Inc.). The height of the carrier in this example is about 1.5 inches, and the inner diameter is about 0.75 inch. A mechanically applied pressure load is imparted to the system by a type 5569 Instron machine. In this example infiltration occurs at about 100 MPa at 20° C. Then the temperature is increased using a water bath (e.g. DigiTrol II Z28, 549-8, Aldrich) to 40° C. and then 50° C., and the infiltration pressure is measured again at both temperatures. In this example the infiltration pressures are about 110 and 120 MPa at 40° C. and 50° C., respectively. Thus, the temperature dependence of infiltration pressure indicates that the system can be controlled thermally.

Still another very specific example comprises sodium acetate solutions. According to this example, about 139 grams of sodium acetate is mixed with about 100 grams of water at 0° C. to the point of saturation. In this example, temperature can be controlled with an ice-water bath. Then about 0.5 grams of nanoporous ZSM-5 zeolite is added to about 4.0 grams of the aqueous sodium acetate solution at about 0° C. and placed in the stainless steel carrier described above. The carrier is then sealed with the piston, and the infiltration pressure is measured using the Instron machine. In this example the infiltration pressure is about 124 MPa at 0° C. The system temperature is then increased using a water bath, and the infiltration pressure is re-measured at various temperatures. The data is shown in the following table.

TABLE 1

| Temperature (° C.) | Pressure (MPa) |
|---|---|
| 0 | 120 |
| 10 | 140 |
| 20 | 170 |
| 30 | 200 |
| 40 | 210 |

Figure 3:
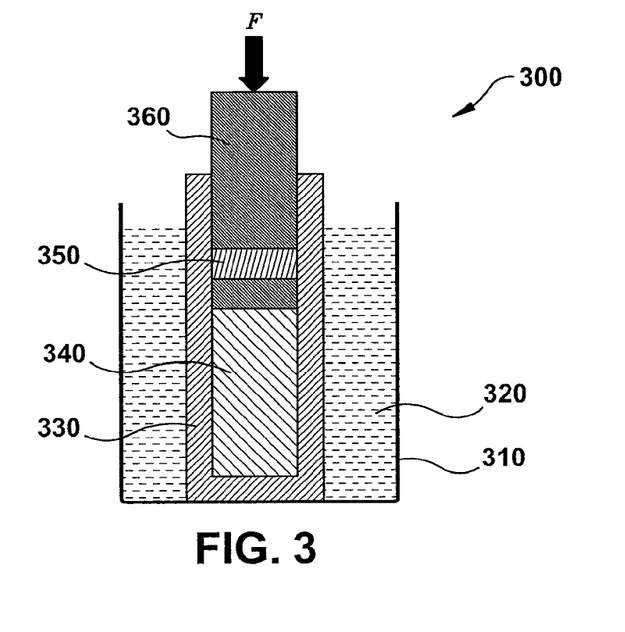
FIG. 3 is a diagram of a thermally controllable nanoporous intelligent system in a thermal bath.
Figure 4:
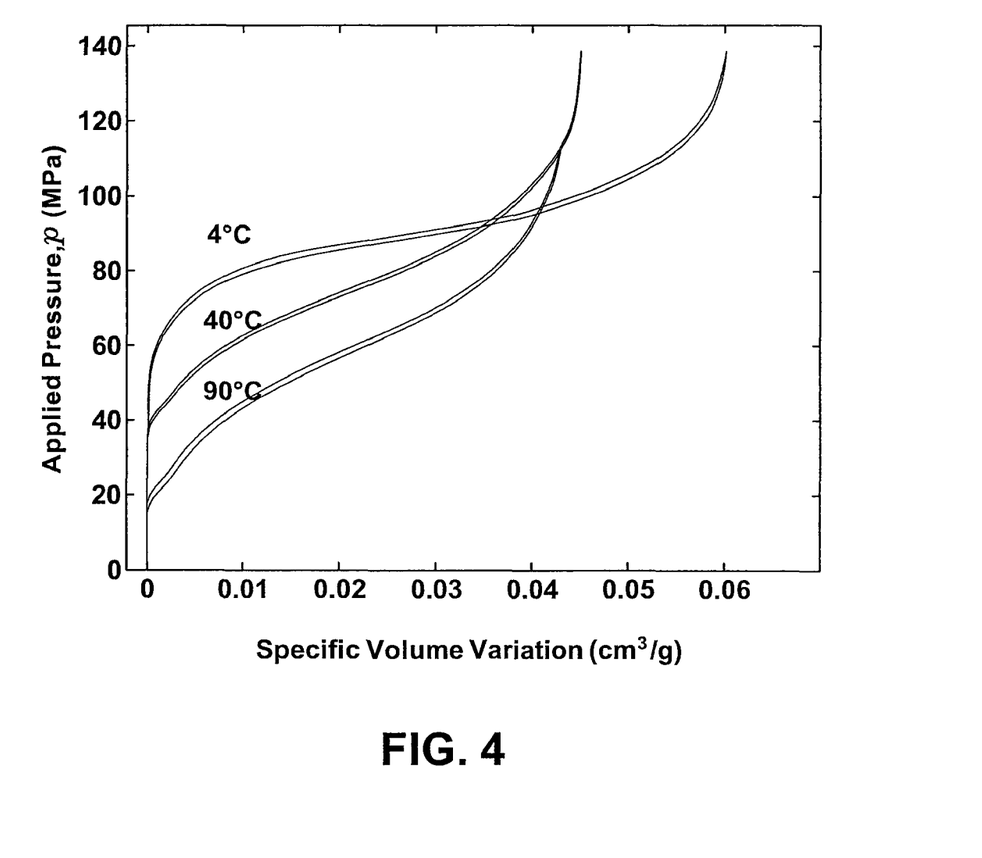
FIG. 4 is a set of sorption isotherms of the thermally controllable smart system at different temperatures.

Another example of a thermally controllable nanoporous smart system is shown in FIG. 3. The system 300 comprises about 0.5 grams of UOP HiSiv 3000 silicalite particles in about 5 grams of distilled water. HiSiv 3000 adsorbent is a hydrophobic high-silica molecular sieve that possesses a pore structure capable of adsorbing molecules with critical diameters up to about 0.6 nm. The particle size in this example is smaller than 200 mesh. As shown in FIG. 3, the liquid/particle system 340 is sealed in a stainless steel carrier 330, and piston 360 fitted with a PU-90 O-ring 350. The carrier/piston assembly is placed in a temperature controlled bath 310, 320. The cross sectional area of the container is A=286.5 $mm^2$.

According to this example, a type 5569 Instron machine is used to compress the stainless steel piston into the container at a constant rate of 1.0 mm/min. At atmospheric pressure, the aqueous media cannot enter the nanopores because the silicalite particles are hydrophobic. But, as pressure increases the capillary effect is overcome and pressure-induced infiltration occurs. Accordingly, the system compressibility decreases significantly, thus forming the infiltration plateau as shown in the sorption isotherm (see FIG. 4). Eventually, as the accessible pore volume is filled infiltration stops, and the slope of the sorption isotherm becomes large again. Then, the crosshead of the Instron machine is moved back at the same speed (i.e., 1.0 mm/min). Due to the decrease in pressure, the confined liquid is expelled from the nanopores, and the system volume substantially returns to its initial value. As shown in FIG. 4, hysteresis of sorption isotherm is very small. In this particular example, the load applied on the piston, F, is measured by an Instron 50 KN load cell, and the displacement of the crosshead, x, is measured by the linear variable displacement transducer (LVDT) of the Instron machine. The pressure is calculated as p=F/A, and the specific volume variation was calculated as $\Delta V = x \cdot A/m$, where m is the mass of the silicate particles.

During testing, the container is immersed in a Sigma-Aldrich Z51 317-2 controlled-temperature water bath equipped with a Sigma-Aldrich DigiTrol Z28 549-8 controller. The infiltration process is performed at various temperatures in the range of about 4° C. to about 90° C. As shown in FIG. 4, the infiltration pressure $p_{in}$ is strongly dependent on temperature, T. As T increases infiltration pressure decreases. While not wishing to be bound to any particular theory, this phenomenon is believed to be due to the thermally induced change in the solid-liquid interfacial energy. At a constant working pressure $p_w$ of about 55 MPa, at 90° C. pressure induced infiltration can be triggered in most accessible pores. As temperature decreases, $p_{in}$ increases, and therefore $p_w$ becomes insufficient to keep the confined water in the nanoenvironment of the pores. Therefore the confined liquid is expelled and the system volume increases. As the temperature returns to its initial value, the aqueous media is forced into the nanopores again. Thus, the system exhibits a thermally controllable volume and/or shape memory.

Electrically Controlled Systems:

The surface wetting effect caused by electrically energizing the interface can be understood according to the following theory. When the ions in an electrolyte solution or the electrons in a liquid metal approach the surface of an electrode, they are subjected to anisotropic forces that lead to a net orientation of dipoles and a net/excess charge on a laminar. As a result, both sides of the interface become electrified. As $\Delta\phi$ varies, the charge density at the interface, $\sigma_M$, changes accordingly, which in turn affects the interfacial tension. This phenomenon, known as the electrocapillary effect, can result in an about 30% to about 50% variation in $\gamma_{ls}$ as $\Delta\phi$ increases or decreases. The total potential difference can be decomposed to $\Delta\phi = {}^M\Delta^S\psi + {}^M\Delta^S\chi$, where ${}^M\Delta^S\psi = \psi_M - \psi_S$ is the Volta potential, $\psi_M$ and $\psi_S$ are the potentials of the solid and liquid phases, respectively; and where ${}^M\Delta^S\chi$ is the Chi potential accounting for the dipole contribution. In the general case, the intensive factors characterizing the system are $\{T, p, \gamma_{ls}, \Delta\phi, \mu^*\}$, where $\mu^*$ is the specific work of transfer. For an isolated system, at constant temperature and pressure, the thermodynamic equilibrium condition is reduced to the Lippmann equation $\partial\gamma_{ls}/\partial\Delta\phi = -\sigma_M$. Note that $\partial\sigma_M/\partial\Delta\phi = C_e$, where $C_e$ is the capacity. If $C_e$ is constant, $\gamma_{ls}$ follows the Helmholtz-Perrin theory:

$$\gamma_{ls} = \gamma_{max} - \hat{\epsilon}\hat{\epsilon}_0 \Delta\phi^2 / 2d_l$$

where $\gamma_{max}$ is the maximum interfacial tension, $\hat{\epsilon}$ the dielectric constant, and $\hat{\epsilon}_0$ the permittivity of free space. If, on the other hand, the $\Delta\phi$ dependence of $C_e$ must be taken into account, the effect of the "charge cloud" should be considered. For example, in the Gouy-Chapman model, the capacity is $C_G=(2\hat{\hat{\epsilon}}_0\bar{z}^2 e_0{}^2 \bar{C}_0/k_B T) \cdot \cosh(\bar{z}e_0\psi_M/2k_B T)$, where $\bar{z}$, $e_0$ and $\bar{C}_0$ are system constants. Alternatively, the Stern Model applies to systems where some charges are localized on the electrode and others are scattered in thermal disarray. The Stern Model can be stated as $1/C_s=1/C_e+C_G$, where $C_s$ is the effective capacity.

Figure 2:
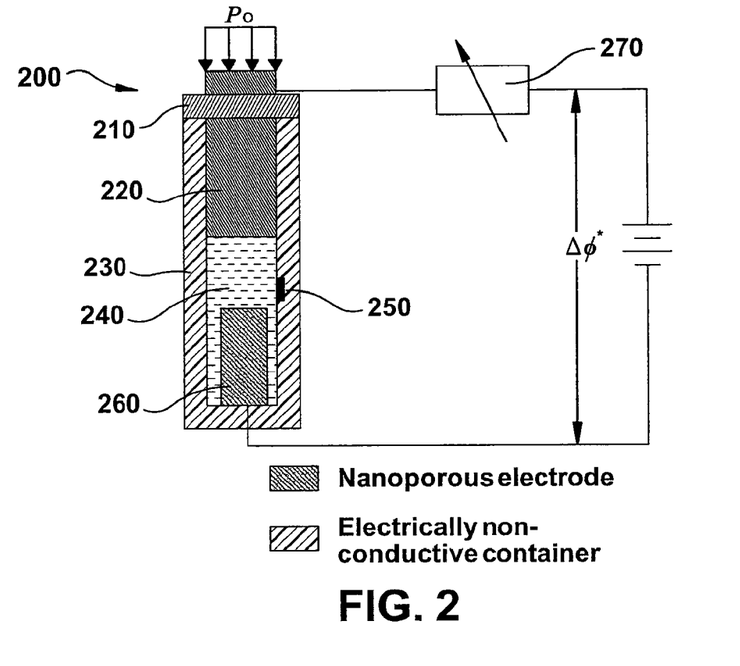
FIG. 2 is a schematic diagram of an electrically controllable nanoporous smart system.

FIG. 2 illustrates the general principles set forth above for electrically controlled systems. A typical system 200 comprises a carrier 230 receiving a piston 220 to which it is sealed with a sealing means 210 such as a gasket. The carrier/piston assembly contains an aqueous electrolyte solution 240, and the assembly is in electrical communication with a nanoporous electrode 260. The assembly is also fitted with a pressure sensor 250.

In some embodiments, the solid-liquid interface is neutrally stable at a working pressure. Neutrally stable means that the liquid has reached an equilibrium condition where the liquid will neither infiltrate nor deinfiltrate further at constant temperature, pressure and/or voltage. In mathematical terms, this condition can be expressed as $\gamma_s^*=\gamma_{ls}$. As the potential difference varies, the liquid either flows reversibly out of, or into, the nanopores. Thus, some electrically controlled embodiments are capable of energy densities and displacements comparable to that of thermally controlled systems. Additionally, electrically controlled embodiments comprise a structurally simple apparatus and a high degree of controllability.

Interfacial properties are strongly dependent on electrical potential. Thus, in order to form an electrically controlled smart system, either the liquid or the solid or both can be electrically conductive. For instance, in one embodiment an electrically conductive liquid is used with an insulating nanoporous material and/or solid. In another embodiment an insulating liquid is used with an electrically conductive nanoporous material and/or solid. In still another embodiment an electrically conductive liquid is used with an electrically conductive nanoporous material and/or solid.

The system can contain one or more liquids. In one embodiment, the present invention comprises two immiscible liquids contained within a porous electrode. The liquids occupy adjacent portions of the electrode, thus forming a liquid-liquid interface. When a voltage is applied to the electrode the interfacial energy changes so that one of the liquids tends to wet more of the solid while the other tends to wet less as compared to the condition where no potential is applied. Accordingly, the liquid-liquid interface moves relative to the electrode. This shift in the position of the interface is reversible, which means that when the voltage is removed the interface returns to its original position.

The concept of using nanoporous materials in intelligent systems can be extended to any thermal or electrical methods that can lead to variation in solid-liquid interfacial energy and thus trigger wetting-dewetting or dewetting-wetting transition under working pressure.

Some embodiments related to electrically controlled systems involve the use of one or more electro-conductive nanoporous materials as a capacitor, and one or more nanoporous materials as a pressure adjustor. According to such embodiments, both materials (or sets of materials) are immersed in an electrolyte solution. As a voltage is applied to the capacitor, counter ions are adsorbed to the one or more nanopores present therein, and therefore the ion concentration in the bulk liquid (i.e., outside the capacitor) decreases. As a result, the ion density at the solid-liquid interface in the nanopores of the pressure adjustor also changes. This leads to a variation in solid-liquid interfacial energy, which in turn affects the infiltration pressure. As the infiltration pressure increases above, or decreases below, the working pressure, the effective de-wetting-wetting or wetting-de-wetting transition takes place. Thus, the shape and/or volume of the system can be reversibly controlled.

Some electrically controlled embodiments function by causing electrochemical reactions to occur by applying an appropriate voltage to a solution. In such embodiments the electrochemical reaction has the effect of changing the concentration of the reactant, which in turn affects the ion density at the solid-liquid interface in the nanopores. This change in ion density causes a change in infiltration pressure. If the infiltration pressure crosses, increases above, or decreases below, the working pressure then the de-wetting-to-wetting or wetting-to-de-wetting transition occurs. Inasmuch as the foregoing process is reversible, the system has volume and/or shape memory. Any of a variety of voltage-sensitive reagents can be used in embodiments such as this one. Some such reagents include, but are not limited to, sulfate acids in combination with lead and lead oxide electrodes. Other reagents include, but are not limited to, metal salt/electrode systems such as those which are used in rechargeable batteries, wherein metal ions are electro-coated onto, or electro-decomposed from, an appropriate electrode.

In one example, a liquid contains 15% sulfate acid. Charging the liquid for five about minutes using lead and lead oxide electrodes can lead to 5% variation in the infiltration pressure of ZSM-5 silicate.

In some electrically controlled embodiments, chemical reactions can be avoided at higher applied voltages. This can be accomplished by coating the nanopore walls with insulating films and/or functional groups. For instance, in one embodiment an electrode comprising an electroconductive porous network and/or mesh is filled with an electrically nonconductive nanoporous material. The nonconductive nanoporous material acts as an insulating layer, which protects the surrounding solution from being directly exposed to the electrode (i.e., the conductive network, and/or mesh).

Figure 5:
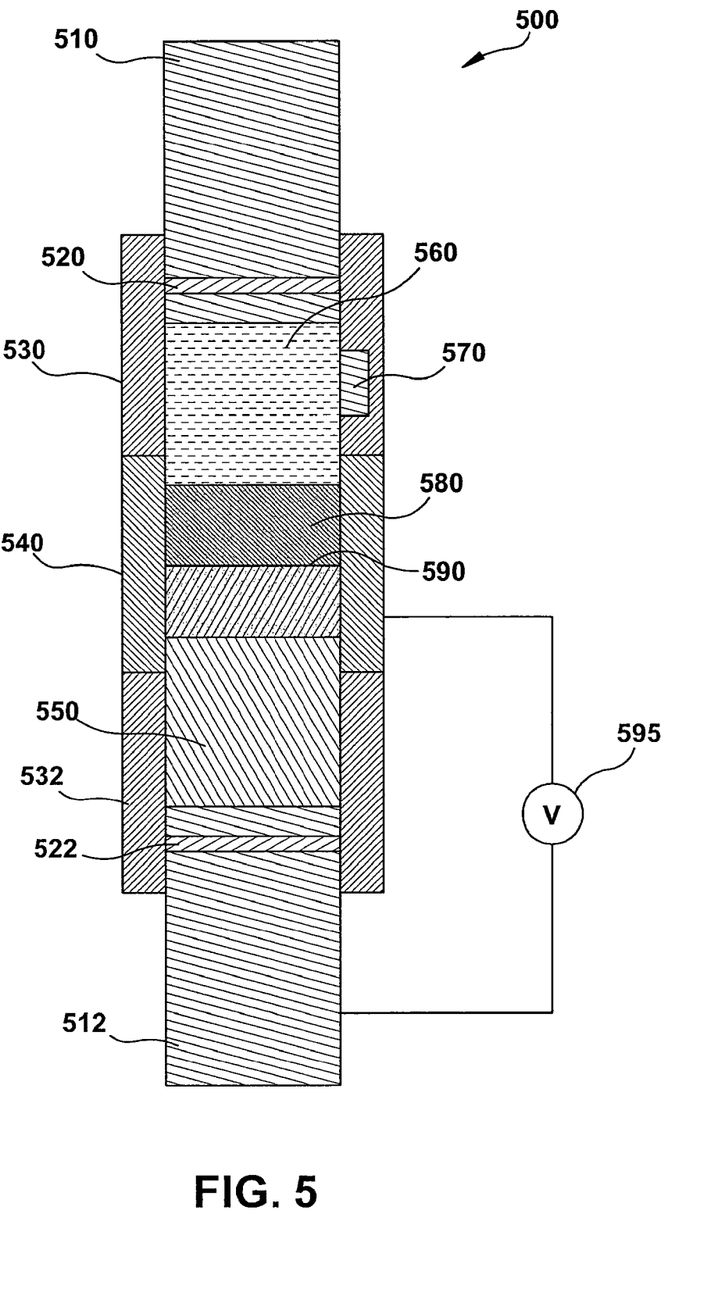
FIG. 5 is a schematic diagram of an electrically controllable nanoporous smart system.
Figure 6:
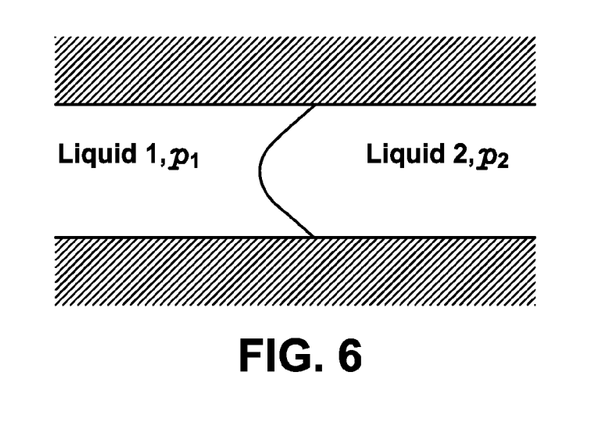
FIG. 6 is a schematic diagram of the liquid interface in a nanopore.

One electrically controlled example is shown in FIG. 5. According to this example the system 500 comprises a copper carrier member 540 which is connected to a first polymethylmethacrylate (PMMA) carrier member 530 at one end, and to a second PMMA carrier member 532 at the other end. The assembly of carrier members form a cylinder with a first end and a second end. The first end receives a first piston 510, to which it is sealed with a sealing means 520 such as an o-ring. The second end receives a second piston 512, to which it is sealed with a sealing means 522, such as an O-ring. The assembly further comprises a pressure sensor 570, which is in pneumatic communication with the interior of the carrier assembly. The copper portion of the carrier assembly is in electrical communication with a nanoporous Monel rod electrode 580.

The carrier assembly forms a first interior space bounded by the interior walls of the carrier, the first piston 510, and the electrode 580. This space is capable of containing a hydrophobic liquid 560 such as an oil, which is capable of infiltrating, or being caused to infiltrate, the electrode 580. The carrier assembly also forms a second interior space bounded by the interior walls of the carrier, the second piston 512, and the electrode 580. This space is capable of containing a liquid 550 such as an aqueous solution of calcium chloride, which is capable of infiltrating, or being caused to infiltrate, the electrode 580.

In one variation of the foregoing example the nanoporous Monel rod electrode 580 has an OD of about 0.3750 inch, a length of about 0.75 inch, a micron grade of about 0.5, and an average pore size of about 500 nm. The nanoporous rod 580 is press fitted to the copper carrier member 540, as shown in FIG. 5. According to this variation, the lengths of the copper carrier member and the PMMA carrier members are 50 mm and 70 mm, respectively. The system can be assembled by facing the second end of the carrier up without the second piston 512 in place. Then an aqueous solution 550 of 30 weight percent $CaCl_2$ can be added carrier and sealed with the second piston 512. The assembly is then inverted with the first end facing up, and the first piston 510 removed. The $CaCl_2$ solution is then driven into the nanoporous rod 590 by compressing the second piston 512. With the liquid 550 line kept above the nanoporous electrode 580, the second piston 512 is moved back and forth in a relatively small range so as to eliminate air bubbles. Next, about 10 mL of Sigma M2047 methyl salilylate oil 560 is added through the first end of the carrier assembly, and sealed with the first piston 510. The oil-aqueous 590 interface is moved to roughly the mid point of the nanoporous rod 580 by compressing the first piston 510 while simultaneously withdrawing the second piston 512. The pistons (510, 512) are then fixed in place, and the pressure at the first end is measured using a pressure sensor 570 such as a Honeywell 060-1544-26 model-s. According to this example, the output signals are received by a National Instruments 6936E Data Acquisition card connected to a Dell Latitude D600 computer.

According to this example, a DC voltage is applied between the copper carrier member 540 and the second piston 512. One appropriate means for applying such a voltage is the Proteck 6030R DC power supply. The solid-liquid interfacial energy in the nanopores varies with applied potential. While not wishing to be bound to any one particular theory, it is believe that this variation is due to the electrocapillary effect. Since the solid-oil and solid-$CaCl_2$ solution interfacial energies change at different rates, the pressure in the container changes as shown in Table 2 (Table 2 shows, among other things, pressures at different voltages). According to this example, the pressure variation is defined as the different between the pressure at a given voltage and the pressure at zero voltage, where the difference is taken as the average of ten measurements. Notably, the pressure increases regardless of whether the voltage is positive or negative. A positive voltage means the potential of the copper carrier member 540 is higher than that of the second piston 512. This is consistent with the theory that the relationship between interfacial energy and potential difference is parabolic. Thus, the pressure change can be reversed by adjusting the voltage.

Figure 7:
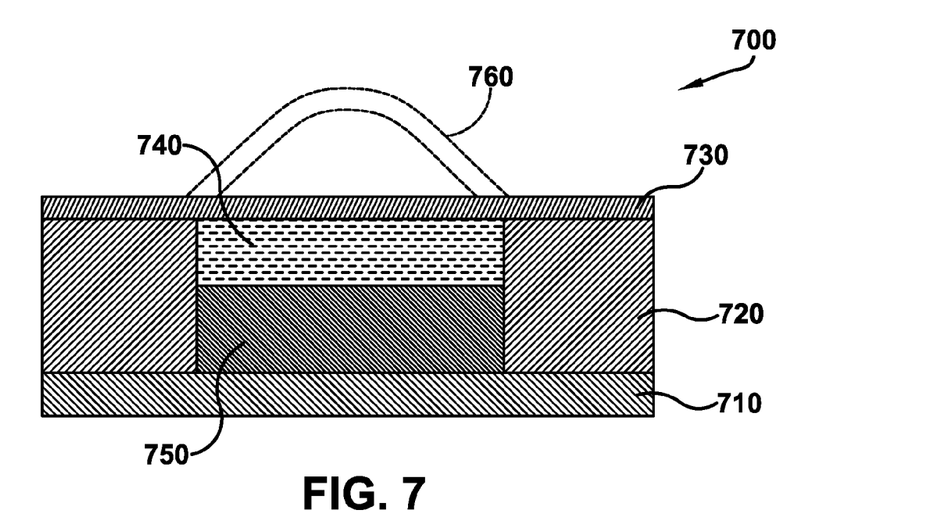
FIG. 7 is a diagram of an embodiment having a deformable membrane energy transducer.

Alternative Systems:

In another embodiment of the present invention the energy transducing member can be a deformable membrane as shown in FIG. 7. Generally, in this embodiment the nanoporous material 750 and liquid 740 are contained within a carrier having a deformable membrane. For instance, as shown in FIG. 7, one arrangement may include a carrier comprising a container 720, a sealing layer 710, and a deformable membrane 730. As the effective wetting to dewetting transition occurs, the volume increases and causes the membrane 730 to deform, forming a bulge. The deformable membrane 730 can comprise elastomeric polymers such as silicones, polyurethanes, rubbers, and the like. The deformable membrane 730 can also comprise high-deformability metals and alloys such as superalloys, pure metals, and the like. This embodiment can be manually, mechanically, thermally or electrically controlled.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A volume and/or shape memory system comprising:
    (a) an energy transducing member;
    (b) a carrier, wherein the energy transducing member is carried by the carrier and movable relative thereto;
    (c) one or more nanoporous materials contained within the carrier and providing nanopores; and
    (d) one or more solutions contained within the carrier, wherein the solution is in contact with the nanoporous material and the energy transducing member, the solution being saturated or supersaturated with a solid temperature-sensitive compound, such that temperature changes in the solution result in precipitation or dissolution of the solid temperature-sensitive compound, thereby changing an ion density at the interface between the nanoporous materials and the solution, and
    wherein a temperature change to the solution affects the wetting of the one or more nanoporous materials and causes the solution to enter or exit the nanopores thereof to effect movement of the energy transducing member.

2. The system of claim 1, wherein the carrier comprises a cylinder having one closed end and one open end capable of receiving the energy transducing member.

3. The system of claim 1, wherein the carrier and/or energy transducing member comprise a material independently selected from one or more of metals, alloys, and organic polymers.

TABLE 2

| Voltage (V) | −1 | −0.6 | −0.2 | 0 | 0.2 | 0.6 | 1 |
|---|---|---|---|---|---|---|---|
| Pressure (psi) | 68.7492 | 67.0618 | 65.0799 | 63.7742 | 66.3308 | 68.6976 | 70.2926 |
| Pressure (psi) | 68.6802 | 68.7267 | 66.4022 | 63.8742 | 66.5702 | 67.6859 | 68.7858 |
| Pressure (psi) | 68.7016 | 66.8973 | 66.0981 | 63.0000 | 65.9987 | 68.4653 | 68.9873 |
| Pressure (psi) | 68.0192 | 67.9436 | 64.0972 | — | 67.0012 | 67.7896 | 70.0121 |
| Pressure (psi) | 69.4532 | 69.0113 | 67.0111 | — | 66.4532 | 66.9879 | 69.9432 |
| Pressure (psi) | 69.9842 | 67.1320 | 65.5643 | — | 66.6783 | 69.0236 | 69.9873 |
| Pressure (psi) | 67.9872 | 66.9872 | 66.3022 | — | 67.1235 | 68.6896 | 68.0987 |
| Pressure (psi) | 68.7065 | 67.3457 | 66.1098 | — | 65.8762 | 67.9863 | 69.8732 |
| Pressure (psi) | 68.9862 | 67.9643 | 65.9879 | — | 68.5702 | 66.9764 | 69.6543 |
| Pressure (psi) | 68.6012 | 66.0112 | 66.2347 | — | 65.0981 | 69.0124 | 71.0932 |
| Average (psi) | 68.7869 | 67.5081 | 65.8887 | 63.5454 | 66.5700 | 68.1315 | 69.6728 |
| Pressure variation (psi) | 5.2414 | 3.9627 | 2.3433 | 0 | 3.0246 | 4.5860 | 6.1273 |

4. The system of claim 3, wherein the metal or alloy are independently selected from iron, steels, stainless steels, aluminum, copper, nickel, nickel alloys and nickel-chromium alloys.

5. The system of claim 1, wherein the nanoporous material is selected from one or more of nanoporous oxides, nanoporous silicons, and nanoporous carbons.

6. The system of claim 5, wherein the nanoporous oxides are selected from one or more of silica, titania, alumina, zirconia, magnesia, $Nb_2O_5$, $SnO_2$, $In_2O_3$, and ZnO.

7. The system of claim 5, wherein the nanoporous material includes one or more surface coatings for adjusting the surface tension of the nanoporous material.

8. The system of claim 7, wherein the one or more surface coatings comprise hydroxyls, silanes, siloxanes, organically substituted siloxanes, alcohols, phenols, amines, carboxylic acids, sulfates, sulfites, sulfides, nitrates, nitrites, nitrides, phosphates, phosphites, nitriles, isocyanides, isothiocyanides, thiols.

9. The system of claim 8, wherein the solution comprises one or more materials selected from de-ionized water, alkane oils, benzene, toluene, alkyl alcohols, and n-heptane.

10. The system of claim 8, wherein the solution comprises one or more materials selected from aqueous electrolyte, organic molten salts, molten metals, mercury, gallium, and lead.

11. A volume and/or shape memory system comprising:

(a) a carrier means; and (b) an energy transducing means, wherein the carrier means receives the energy transducing means, wherein the carrier means receives a conductive nanoporous electrode, the conductive nanoporous electrode being capable of absorbing a liquid, wherein the liquid is contained within the carrier means and the liquid is also in contact with the conductive nanoporous electrode, wherein the conductive nanoporous electrode is non-wetting towards the liquid in absence of voltage being applied to the conductive nanoporous electrode, where such voltage causes the conductive nanoporous electrode to absorb the liquid, and wherein removing the voltage being applied to the conductive nanoporous electrode results in expulsion of substantially all of the liquid from the conductive nanoporous electrode thereby resulting in an absorption/desorption process or processes which in turn result in system volume changes that cause the energy transducing means to move relative to the carrier means.

* * * * *